United States Patent
Chen et al.

(10) Patent No.: US 10,282,669 B1
(45) Date of Patent: May 7, 2019

(54) LOGICAL INFERENCE EXPERT SYSTEM FOR NETWORK TROUBLE-SHOOTING

(71) Applicant: Amazon Technologies, Inc., Reno, NV (US)

(72) Inventors: Po-Chun Chen, Herndon, VA (US); Patrick Brigham Cullen, Herndon, VA (US)

(73) Assignee: Amazon Technologies, Inc., Reno, NV (US)

(*) Notice: Subject to any disclaimer, the term of this patent is extended or adjusted under 35 U.S.C. 154(b) by 5 days.

(21) Appl. No.: 14/205,175

(22) Filed: Mar. 11, 2014

(51) Int. Cl.
*G06N 5/02* (2006.01)
*G06N 7/00* (2006.01)
*G06N 7/02* (2006.01)
*G06F 11/07* (2006.01)

(52) U.S. Cl.
CPC .......... *G06N 7/005* (2013.01); *G06F 11/079* (2013.01); *G06N 5/02* (2013.01); *G06N 7/02* (2013.01)

(58) Field of Classification Search
CPC ............ G06N 7/02; G06N 7/005; G06N 5/02; G06N 5/046; G06N 5/047
See application file for complete search history.

(56) References Cited

U.S. PATENT DOCUMENTS

| | | | | |
|---|---|---|---|---|
| 2007/0094193 A1* | 4/2007 | Joseph | ................... | G06N 5/042 706/46 |
| 2012/0239379 A1* | 9/2012 | Gershnik | .............. | G06F 17/275 704/8 |
| 2014/0032470 A1* | 1/2014 | McCarthy | .............. | G06Q 10/20 706/47 |
| 2015/0310341 A1* | 10/2015 | Danielsson | ............ | G06N 5/046 706/48 |

* cited by examiner

*Primary Examiner* — Jigar P Patel
(74) *Attorney, Agent, or Firm* — Baker & Hostetler LLP

(57) ABSTRACT

Techniques are disclosed for determining a possible cause of a problem in a computer system. A trouble-shooting component of the computer system may perform forward chaining on the available data to determine one or more hypotheses of the cause of the problem. The component may then perform backward chaining on the hypotheses to determine missing information that, if known, would increase or decrease the likelihood of the hypotheses being true. Then, the component may perform Bayesian probability analysis on the known and missing information to determine a probability that each hypothesis is correct.

20 Claims, 8 Drawing Sheets

LOGICAL INFERENCE EXPERT SYSTEM FOR NETWORK TROUBLE-SHOOTING

BACKGROUND

In datacenters, trouble-shooting a network connectivity problem may be difficult, particularly when the network connectivity problem may exist somewhere outside of the datacenter, between the datacenter and a customer of the datacenter. Performing this trouble-shooting usually requires a wide range of knowledge and is a human-intensive process that takes a long amount of time.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

In more detail, trouble-shooting a network connectivity problem for a datacenter, where the problem may be located outside of the datacenter and between the datacenter and a customer of the datacenter may be difficult for the following reasons:

(1) Performing this trouble-shooting may require a wide range of knowledge, in both the computer network in the datacenter and between the datacenter and the customer, as well as requiring knowledge of the customer's network devices.

(2) Performing this trouble-shooting is usually based on partial information. Information is usually incomplete due to the desired information being unavailable to a tool that is used in trouble-shooting (e.g., the information is located outside of the system that performs the troubleshooting —on a network router on an Internet link between a customer and the trouble-shooting tool that is not configured to provide the desired information to the tool, such as a routing table. This may be contrasted with the known information, which may be located within the system that performs the troubleshooting).

(3) Performing this trouble-shooting may require experience to know what missing information needs to be collected. Gathering every piece of missing information may be time-consuming and may also ultimately be unnecessary in the trouble-shooting process.

A solution to these problems is to provide an expert system that utilizes logical inferences based on the partial information that is known to determine possible solutions to a network connectivity problem. At a high-level, this expert system takes what information is known about the state of the network and uses is it as input to a forward chaining rules-based system to produce one or more hypotheses of a cause of the network connectivity problem. These one or more hypotheses are provided as input to a backward chaining reasoning system to determine additional information that will either increase or decrease the likelihood that the hypothesis or hypotheses is/are true. The known information, the hypothesis or hypotheses, and the additional information may then be provided to a Bayesian process to determine a probability that each hypothesis is correct. This forward chaining, backward chaining, and use of Bayesian probability techniques is described in more detail below, particularly with regard to operations 206-210 of FIG. 2.

A result of performing this process of forward chaining, then backward chaining, then Bayesian probability may be to provide additional information that is useful to someone who is trouble-shooting a network connectivity problem. For example, instead of merely providing a user with an indication that "the network link is down," this system may provide information to the user that: there is a 40% chance that a cable needs to be rolled; a 10% chance that a wrong type of fiber optic cable is being used; and/or to please try to roll the cable and check the type of fiber optic cable being used.

Figure 1:
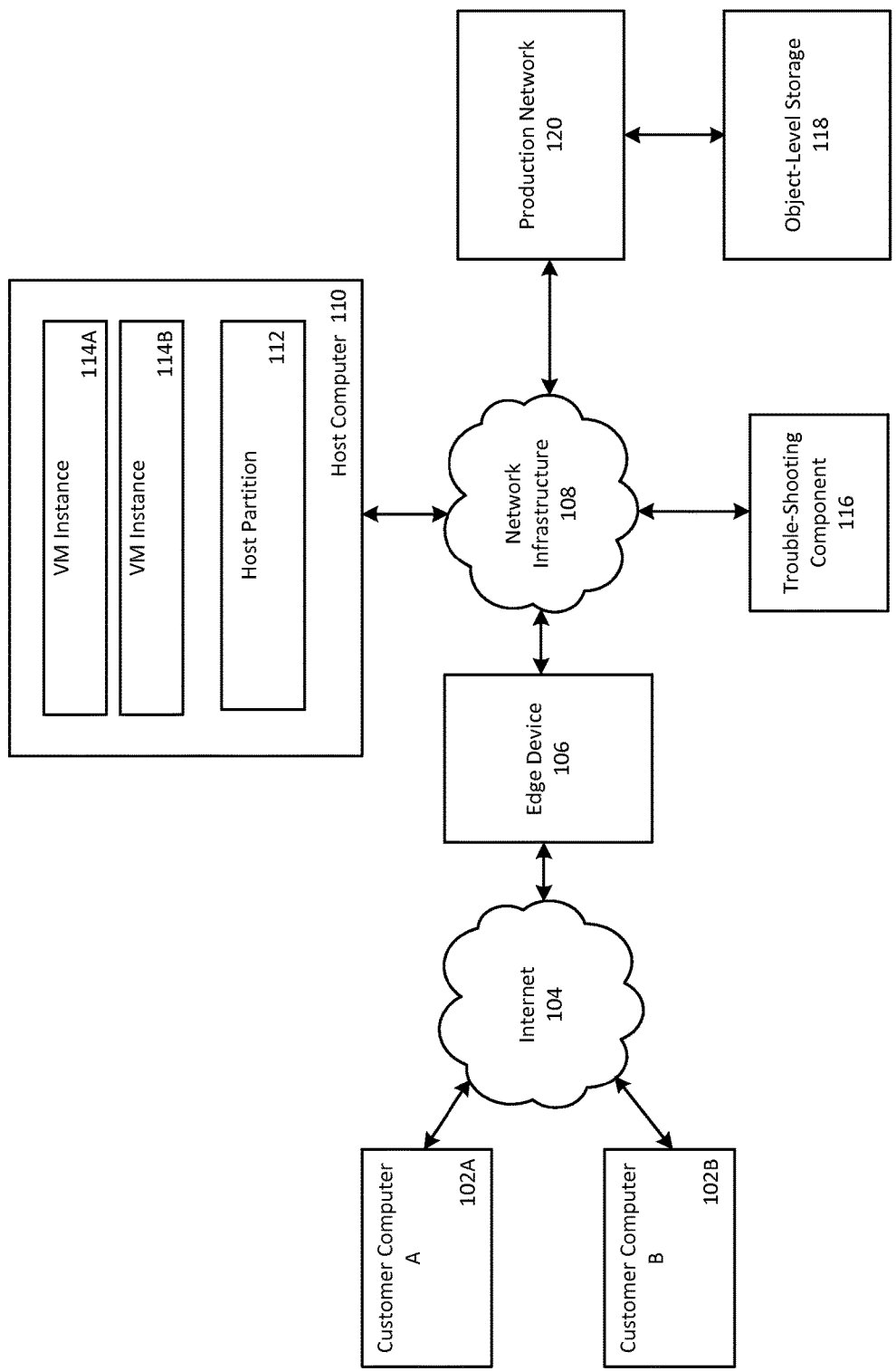
FIG. 1 depicts an example operating environment in which embodiments may be implemented.

FIG. 1 depicts an example operating environment in which embodiments may be implemented. Generally, the operating environment of FIG. 1 includes a multi-customer web services platform that comprises multiple virtual machine instances executing on multiple host computers (the instances and host computers may both be described as being computing nodes), with a trouble-shooting component 116 that determines possible causes of problems, including network connectivity problems within this operating environment. In embodiments, trouble-shooting component 116 may be a computing device that implements the one or more operating procedures of FIGS. 2-5.

Customer computer A 102A and customer computer B 102B are computers possessed by customers, which are configured to access the multi-customer web services platform via a public network, e.g., Internet 104. In turn, the connection point between the multi-customer web services platform and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are trouble-shooting component 116, production network 120, object-level storage 118 (via production network 120) and host computer 110.

Host computer 110 is configured to execute one or more virtual machine instances (depicted here as VM instance 114A and VM instance 114B) and a host partition 112. While host computer 110 is depicted here as executing two VM instances 114, it may be appreciated that host computer 110 may execute more or fewer VM instances.

In embodiments, a customer directs the multi-customer web services platform to execute one or more VM instances on the customer's behalf. These VM instances may then execute to perform functions for the customer, such as a function of a web server for the customer's web site, or to perform compute functions, such as encoding video.

In addition to this aspect of the web services platform, customers may also store data in object-level storage 118. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, as described in more detail herein below, trouble-shooting component 116 may store data on object-level storage 118 in the process of trouble-shooting problems (e.g., trouble-shooting component 116 may store rules used in forward chaining and backward chaining processes on object-level storage 118, or data about the computing environment that is used in the forward chaining and backward chaining processes).

As depicted, production network 120 may be used to serve a public web site (such as an e-commerce web site), as well as provide services used internally by an entity that maintains the web services platform (e.g., document management systems or databases that identify the employees of the entity for human resource purposes).

Within this operating environment, trouble-shooting component 116 may determine a possible cause (i.e., a hypothesis) for why there is a problem in the operating environment. An example problem is that customer computer A 102A cannot communicate with VM instance 114A, or that object-level storage 118 is responsive to customer computer B 102B, but object-level storage 118 fails to store objects when instructed to do so by customer computer B 102B.

In the process of trouble-shooting a problem with the operating environment, trouble-shooting component 116 may gather data from other components of the operating environment, like customer computer A 102A, edge device 106, object-level storage 118, and host computer 110, among others. This data may be stored in log files or routing tables on those components, or log files for those components may be stored in another location (e.g., all of the components may store their log files on object-level storage 118). This data may also be obtained by querying those components for data that is not currently being stored in a log file, such as current processor utilization, or by pinging a component to see if it is able to be reached, and respond via a network connection. This gathered data may be used by trouble-shooting component 116 to perform a forward chaining process to determine one or more hypotheses regarding a cause of the problem with the operating environment. An example of performing a forward chaining process is depicted in operation 208 of FIG. 2 and described in more detail below.

There may also be data that trouble-shooting component 116 did not or cannot gather. Trouble-shooting component 116 may not initially gather all available data for the operating environment because doing so would take too much time, would require too much storage space to store, or much of the data has a very low likelihood of being relevant to determining a cause of the problem within the operating environment, so gathering all available data is likely to be a waste of time. Trouble-shooting component 116 may not be able to gather all available data. For instance, some of the data may be configured to be accessible only manually or is unavailable because it is on a network segment that is part of the general Internet 104 that the trouble-shooting component 116 does not have access to, or on customer computer A 102A (or customer computer B 102B) that is owned by a customer (not shown), to which trouble-shooting component 116 does not have access. By performing backward chaining on the hypothesis (or hypotheses) of the cause of a problem with the operating environment, trouble-shooting component 116 may determine which of this missing data is relevant because having it will increase or decrease the likelihood that the hypothesis is true. Then, it may be possible to attempt to gather this missing data, and, additionally, knowing what missing data there is that may be used to determine a probability that the hypothesis is correct. An example of performing a backward chaining process is depicted in operation 210 of FIG. 2, and described in more detail below.

Given both the gathered data that is used in forward chaining to produce a hypothesis and the missing data that is produced from backward chaining from the hypothesis, trouble-shooting component 116 may determine a probability that the hypothesis is correct. An example of determining that the hypothesis is correct is depicted in operation 212 of FIG. 2 and described in more detail below.

Figure 2:
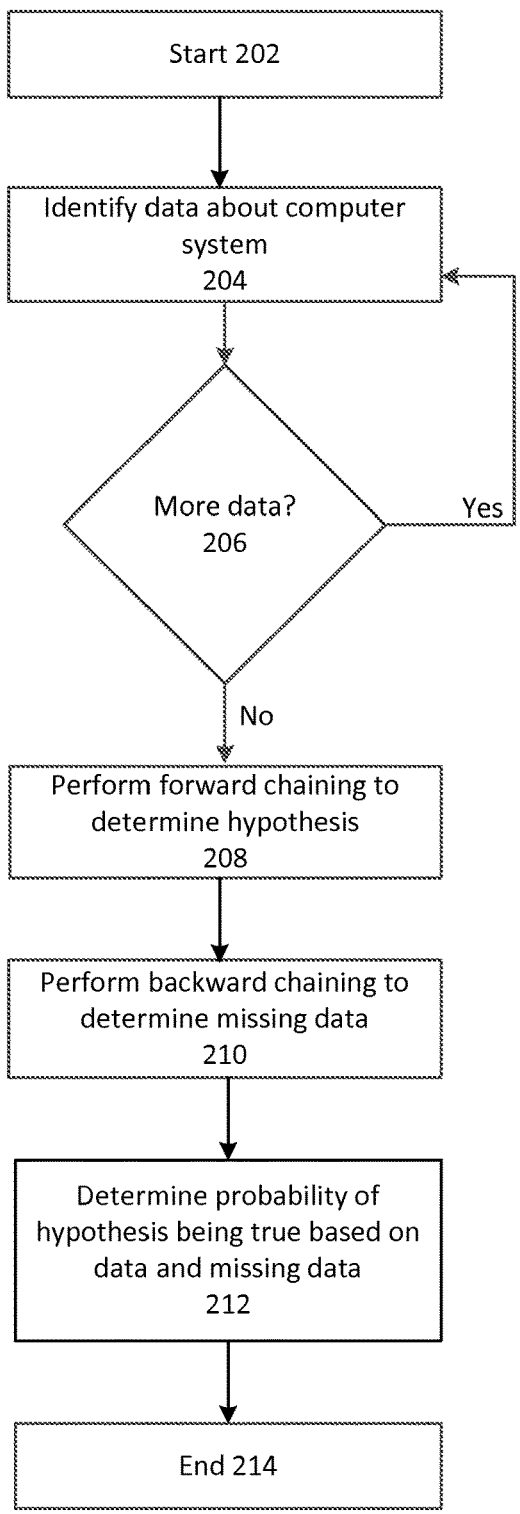
FIG. 2 depicts example operating procedures for determining a hypothesis for why there is a problem with a computing system, as well as determining a probability that that hypothesis is correct.

FIG. 2 depicts example operating procedures for determining a hypothesis for why there is a problem with a computing system, as well as determining a probability that that hypothesis is correct. In embodiments, the operating procedures of FIG. 2 may be implemented in trouble-shooting component 116 of FIG. 1 to determine why the operating environment of FIG. 1 has a problem. For example, the operating procedures of FIG. 2 may be implemented to determine why customer computer A 102A is unable to communicate with VM instance 114A through Internet 104, edge device 106, network infrastructure 108, host computer 110, and possibly host partition 112.

The operating procedures of FIG. 2 begin with operation 202. Then the operating procedures of FIG. 2 move to operation 204, which depicts identifying data about the computer system. This may be considered to involve identifying at least one known piece of data about the computer system, to contrast it from unknown or missing data, as described elsewhere. For example, using the operating environment of FIG. 1, trouble-shooting component 116 may gather data from another component of the operating environment, like customer computer A 102A, edge device 106, object-level storage 118, and host computer 110, among others. This data may be stored in log files or routing tables on those components, or log files for those components may be stored in another location (e.g., all of the components may store their log files on object-level storage 118). This data may also be obtained by querying those components for data that is not currently being stored in a log file, such as current processor utilization, or by pinging a component to see if it is able to be reached and respond via a network connection. After operation 204, the operating procedures of FIG. 2 move to operation 206.

Operation 206 depicts determining whether there is more data about the computer system. This may comprise, for instance, querying another component for data about the computer system or performing another function to gather data, like pinging another component of the computer system. Where in operation 206 it is determined that there is not more data about the computer system, the operating procedures of FIG. 2 move to operation 208. Where in operation 206 is it determined that there is more data about the computer system, the operating procedures of FIG. 2 return to operation 204, where more data about the computer system is identified. This loop from operation 204 to operation 206, and then back to operation 204, may continue for as long as there is more data about the computer system to be identified.

Operation 208 depicts performing forward chaining on the data identified in operation 204 to determine a hypothesis on what the cause of the problem with the computer system is. This may be alternatively described as performing forward chaining on the at least one piece of data to determine a first potential source of the problem. Forward chaining generally is a type of logical reasoning where a computer may start with input data and a set of logical relationships that may be applied to that data, and, from said data and logical relationships, determines an answer (or, where the data and/or logical relationships are incomplete for determining an answer with complete certainty, a hypothesis).

For example, the data may be "A is true," (e.g., there is no network connection between two computers) and the logical relationship may be "If A is true, then B is true" (e.g., if there is no network connection between two computers, then those two computers cannot communicate). Given this data and this logical relationship, the answer may be "B is true." Here, because the antecedent clause of the logical relationship ("If A is true") is true (because the data is "A is true"), then it may be concluded that the consequent ("then B is true") is also true.

There may be significantly more complex data sets and logical relationships used in forward chaining, but this simplified example sets forth the idea. For example, where it is determined above that B is true, and there is an additional logical relationship that sets forth that, "If B is true, then C is true," then it may be concluded that "C is true."

Inasmuch as, given the above example, it cannot be concluded that C is true until after determining that B is true, performing forward chaining may involve performing multiple iterations of applying the data (and later determined consequents) to the logical rules until at which time no additional consequent is determined to be true in the course of a single iteration. After operation 208, the operating procedures of FIG. 2 move to operation 210.

Operation 210 depicts performing backward chaining on the hypothesis to determine missing data. This may alternatively be described as performing backward chaining on the first potential source of the problem to determine at least one additional piece of data that, if known to be true for the computer system, would increase or decrease the likelihood that the first potential source of the problem has been correctly identified for the computer system. In view of forward chaining, backward chaining generally then is a type of logical reasoning where an answer or a hypothesis (using the above terminology from the discussion of forward chaining) is the starting point, and the process moves backwards through logical relationships to determine data that would support the answer or hypothesis if it were true.

Take the above example regarding forward chaining. In backward chaining, the process begins with the answer or hypothesis—"B is true." This is then applied to the logical rule of "If A is true, then B is true," to determine that data that supports A being true also supports the answer or hypothesis that B is true. Note that, using the logical relationship of "If A is true, then B is true," that B being true does not necessarily mean that A is true. There may be situations where B is true and A is not true—the logical relationship only requires that B is true where A is true.

So, working backwards using backward chaining may uncover other data that would support B being true. Take the above example and add the logical relationship, "If C is true, then B is true" (to the prior logical relationship of "If A is true, then B is true," the prior data of "A is true" and the hypothesis or answer of "B is true"). From this and using backward chaining, it may be determined that if C were true, it would further support the hypothesis or answer that B is true. After operation 210, the operating procedures of FIG. 2 move to operation 212.

Operation 212 depicts determining a probability of the hypothesis being true based on the data from operation 204 and the missing data from operation 210. Determining the probability of the hypothesis being true may involve using a Bayesian probability technique. This operation may alternatively be described as performing a Bayesian probability calculation on the at least one known piece of data and the at least one additional piece of data to determine a likelihood that the first potential source of the problem correctly identifies the source of the problem.

Bayesian probability techniques are used to determine the likelihood that something is true where it is uncertain and are generated based on applying new information to previously known probabilities. An example of applying Bayesian probability techniques to a scenario for network troubleshooting is as follows. Say that it is determined that a customer (such as customer computer 102A) cannot connect to an instance (such as instance 114A) across the Internet 104. Specifically, there may be a high rate of packet loss of network packets transmitted between the customer computer and the instance. In this scenario, the probabilities of each of the following being the cause of the problem might be: a 20% chance that the cause is an incorrect configuration of the instance; a 50% chance that the cause is an incorrect configuration of the customer computer; and a 30% chance that there is a physical problem with the fiber cable that connects the instance with the customer computer.

This information may be provided to a network administrator, along with things to check to determine whether each possible cause of the problem is the cause of the problem. Should the network administrator check and determine that the instance is correctly configured, then this information may be used in updating the Bayesian probability analysis that one of the other two hypotheses (an incorrect configuration of the customer computer, and a problem with the fiber connection) is correct. In short, whereas previously, there was previously a 20% chance that the cause is an incorrect configuration of the instance; a 50% chance that the cause is an incorrect configuration of the customer computer; and a 30% chance that there is a physical problem with the fiber cable that connects the instance with the customer computer. With this updated information that the instance is configured correctly, the Bayesian probability analysis may be updated to express that there is a 62.5% chance that the cause is an incorrect configuration of the customer computer, and a 37.5% chance that the cause is a physical problem with the fiber cable that connects the instance with the customer computer.

In this manner, both an initial Bayesian probability analysis may be performed, and a Bayesian probability analysis may be updated as more data is known. An initial Bayesian probability analysis may be performed in this manner where there are default probabilities that certain hypotheses are true for a certain known problem (e.g., a Bayesian probability analysis for a hypothesis that a network connectivity problem is caused by a faulty fiber connection may be initially set to 30% before considering the data). Additionally, a Bayesian probability analysis may be used to update a probability that a hypothesis is correct as more information is known (e.g., a Bayesian probability analysis that a network connectivity problem is caused by a faulty fiber connection may be updated when it is determined after the initial analysis that the cause is not an incorrect configuration of an instance).

Take the following example that describes applying a Bayesian probability technique in a more mathematically formal matter. In this example, suppose that a person's child plays soccer and the odds that this child is a girl are to be calculated. Without knowing anything other than that this person has a child, the odds are (for this hypothetical) 50% that the child is a girl and 50% that the child is a boy. Suppose also that 50% of boys play soccer, which will be identified as P(S|B)=0.5 (which expresses that the probability of event "child plays soccer" given the event "child is boy" is true is 50%). Similarly, let it be that 40% of girls play soccer—P(S|G)=0.4.

Then, the probability that the child is a girl may be calculated with Bayes' formula as such:

$$P(G|S)=P(S|G)*P(G)/P(S)$$

which expands to:

$$P(G|S)=P(S|G)*P(G)/(P(S|G)*P(G)+P(S|B)*P(B))$$

Substituting in the above scenario where 40% of girls play soccer, 50% of boys play soccer, and the odds of a child being a boy or a girl is each 50%, this produces:

$$P(G|S)=0.4*0.5/(0.4*0.5+0.5*0.5)=0.2/(0.2+0.25)=4/9=44\%.$$

So, in this example, the probability that the child is a girl, given that the child plays soccer is 44%.

Put another way, using Bayesian probability techniques, the likelihood of G given S (P(G|S)) may be calculated based on the likelihood of S given G (P(S|G)), and the probabilities of S and G (P(S) and P(G)). In this example, P(G) is what is known about the probability of a child being a girl without factoring in soccer and may be referred to as the prior in Bayesian terminology. Then P(G|S) is the likelihood of a child being a girl once the child playing soccer is factored in and may be referred to as the posterior in Bayesian terminology. While P(S|G)/P(S) identifies the amount of support (in Bayesian terminology) that S provides for G and may be referred to as the quotient in Bayesian terminology.

After the probability has been calculated, information on the hypothesis and its associated probability may be returned to the user who requested information about the cause of the problem. This may comprise identifying the first potential source of the problem and the likelihood that the first potential source of the problem correctly identifies the source of the problem to a user of the computer system. This may also comprise identifying a remedy to the first potential source of the problem to the user of the system. In embodiments, associations between causes of problems and associated remedial actions may be stored in object-level storage 118 and accessed using the identified hypothesis of the cause of the problem to determine the associated remedial action.

In embodiments, the probability analysis (and/or the forward chaining and/or the backward chaining) may be performed based on machine learning, via a machine learning system that learns the probabilities associated with the presence of various data in proving a hypothesis based on input data. This probability analysis may also be performed based on history data of prior probability analyses, or performed based on a user indication of a rule to be used in the probability calculation. After operation 212, the operating procedures of FIG. 2 move to operation 214, where the operating procedures of FIG. 2 end.

Figure 3:
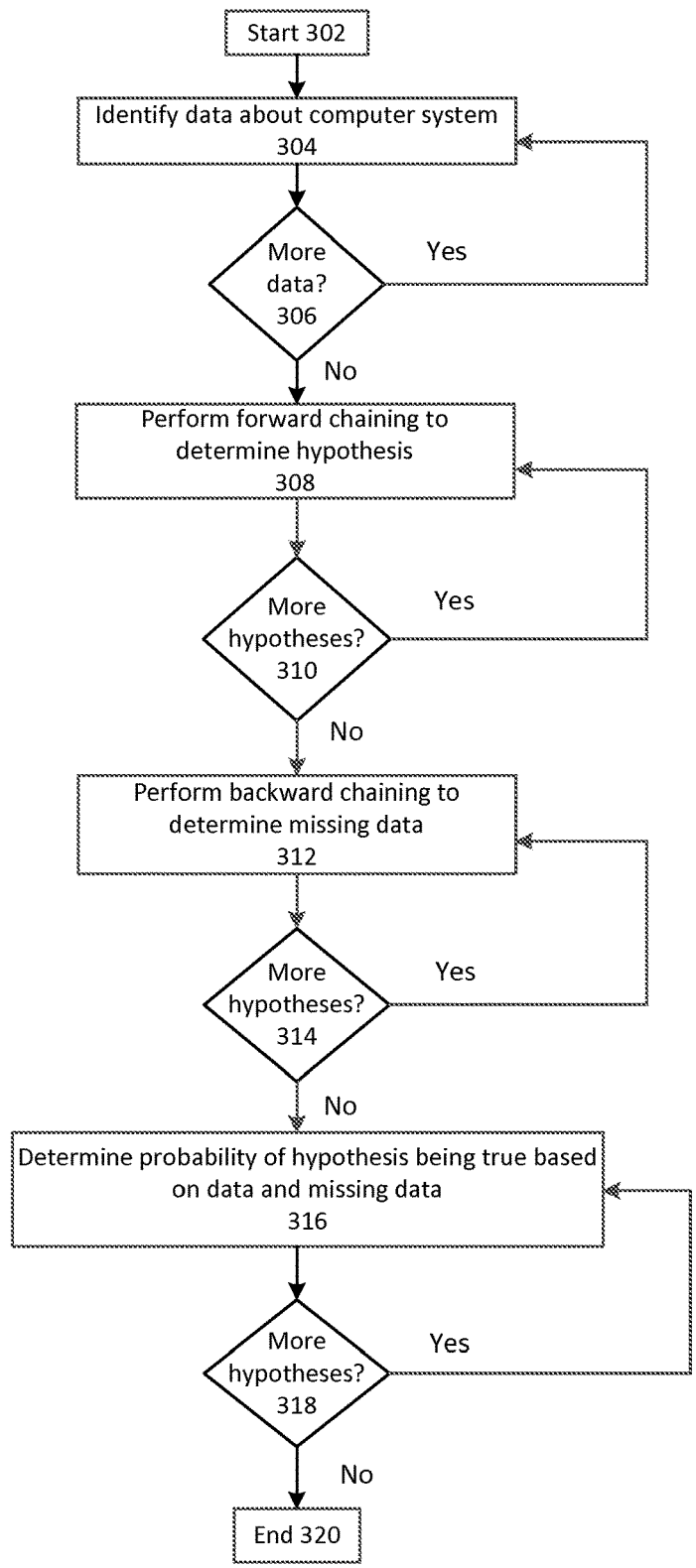
FIG. 3 depicts example operating procedures for determining multiple hypotheses for why there is a problem with a computing system, as well as determining a probability that each hypothesis is correct.

FIG. 3 depicts example operating procedures for determining multiple hypotheses for why there is a problem with a computing system, as well as determining a probability that each hypothesis is correct. The operating procedures of FIG. 3 are similar to the operating procedures of FIG. 2—where the operating procedures of FIG. 2 generally involve one hypothesis, the operating procedures of FIG. 3 develop this subject matter in involving multiple hypotheses.

Similar to the operating procedures of FIG. 2, in embodiments, the operating procedures of FIG. 3 may be implemented in trouble-shooting component 116 of FIG. 1 to determine why the operating environment of FIG. 1 has a problem. For example, the operating procedures of FIG. 3 may be implemented to determine why customer computer A 102A is unable to communicate with VM instance 114A, and produce multiple hypotheses as to why this may be the case, along with a likelihood that each hypothesis is correct.

The operating procedures of FIG. 3 begin with operation 302. Then the operating procedures of FIG. 3 move to operation 304, which depicts identifying data about the computer system. In embodiments, operation 304 may be implemented in a similar manner as operation 204 of FIG. 2. After operation 304, the operating procedures of FIG. 3 move to operation 306.

Operation 306 depicts determining whether there is more data about the computer system. In embodiments, operation 306 may be implemented in a similar manner as operation 206 of FIG. 2. Where in operation 306 it is determined that there is not more data about the computer system, the operating procedures of FIG. 3 move to operation 308. Where in operation 306 is it determined that there is more data about the computer system, the operating procedures of FIG. 3 return to operation 304, where more data about the computer system is identified. This loop from operation 304 to operation 306, and then back to operation 304, may continue for as long as there is more data about the computer system to be identified.

Operation 308 depicts performing forward chaining on the data identified in operation 304 to determine a hypothesis on what the cause of the problem with the computer system is. In embodiments, operation 308 may be implemented in a similar manner as operation 208 of FIG. 2. After operation 308, the operating procedures of FIG. 3 move to operation 310.

Operation 310 depicts determining whether an additional hypothesis may be determined based on the data about the computer system identified in operation 304. In embodiments, the forward chaining process of operation 308 will not resolve to a single hypothesis—it may be such that multiple hypotheses are still possible given the input data. For example, if the problem is that customer computer A 102A cannot communicate with VM instance 114A, and it is determined that VM instance 114A can communicate with edge device 106, it may be that there is a problem with customer computer 102A or with routing performed in Internet 104. Either hypothesis may be correct given the known data. Where this is the case, after one hypothesis has been identified, a second hypothesis may also be identified (via a loop to operation 308) based on the forward chaining.

Where in operation 310 is it determined that an additional hypothesis may not be determined based on the data about the computer system identified in operation 304, the operating procedures of FIG. 3 move to operation 312. Where in operation 310 it is determined that an additional hypothesis may be determined based on the data about the computer system identified in operation 304, the operating procedures of FIG. 3 move back to operation 308, where an additional hypothesis is determined based on the data about the computer system identified in operation 304. This loop from operation 308 to operation 310 and then back to operation 308, may continue for as long as there is an additional hypothesis to determine.

Operation 312 depicts performing backward chaining on the hypothesis to determine missing data. In embodiments, operation 312 may be implemented in a similar manner as operation 210 of FIG. 2. After operation 312, the operating procedures of FIG. 3 move to operation 314.

Operation 314 depicts determining whether there is an additional hypothesis on which to perform backward chaining. In embodiments, this may comprise determining whether the loop of operations 308 to 310 identified multiple hypotheses. For example, an indication of how many hypotheses were determined may be stored in object-level storage 118 by trouble-shooting component 116 in operation 310, and then accessed there.

Where in operation 314 it is determined that there is not an additional hypothesis on which to perform backward chaining, the operating procedures of FIG. 3 move to operation 316. Where in operation 314 is it determined that there is an additional hypothesis on which to perform backward chaining, the operating procedures of FIG. 3 return to operation 312, where backward chaining is performed on an additional hypothesis. This loop from operation 312 to operation 314, and then back to operation 312, may continue for as long as there is an additional hypothesis to process with backward chaining.

Operation 316 depicts determining a probability of the hypothesis being true based on the data from operation 304 and the missing data from operation 312. In embodiments, operation 316 may be implemented in a similar manner as operation 212 of FIG. 2. After operation 316, the operating procedures of FIG. 3 move to operation 318.

Operation 318 depicts determining whether there is an additional hypothesis (as determined from the loop of operations 308 and 310) for which to determine a probability that the hypothesis is true. This operation may be performed in a similar manner as operation 314. Using the example from operation 314, for example, an indication of how many hypotheses was determined may be stored in object-level storage 118 by trouble-shooting component 116 in operation 310, and then accessed there.

Where in operation 318 it is determined that there is not an additional hypothesis for which to determine a probability that the hypothesis is true, the operating procedures of FIG. 3 move to operation 320, where the operating procedures of FIG. 3 end. Where in operation 318 is it determined that there is an additional hypothesis for which to determine a probability that the hypothesis is true, the operating procedures of FIG. 3 return to operation 316, the probability that the additional hypothesis is true is determined. This loop from operation 316 to operation 318, and then back to operation 316, may continue for as long as there is an additional hypothesis to process with backward chaining.

Figure 4:
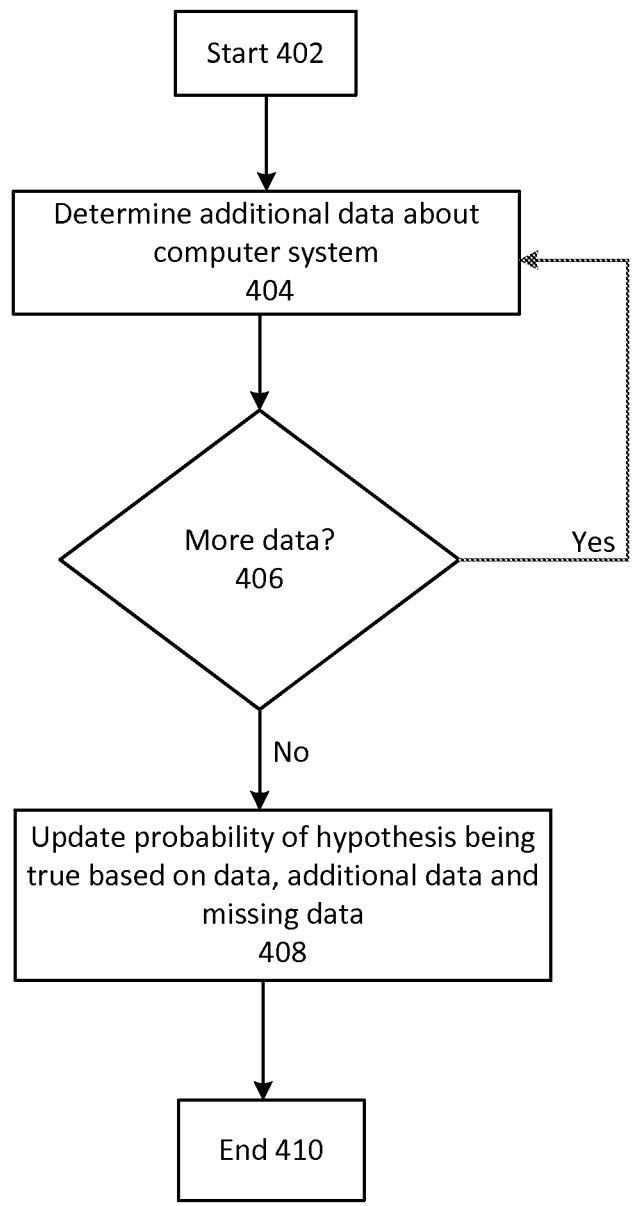
FIG. 4 depicts example operating procedures for updating the probability that a hypothesis for why there is a problem with a computing system is correct, based on determining additional information about the computing system.

FIG. 4 depicts example operating procedures for updating the probability that a hypothesis for why there is a problem with a computing system is correct, based on determining additional information about the computing system. The operating procedures of FIG. 4 may be used to update a hypothesis (or hypotheses) determined via the operating procedures of FIG. 2 or 3. Similar to the operating procedures of FIGS. 2-3, in embodiments, the operating procedures of FIG. 4 may be implemented in trouble-shooting component 116 of FIG. 1. The operating procedures of FIG. 4 begin with operation 402, and then move to operation 404.

Operation 404 depicts determining additional data about the computer system. In embodiments, this may be described as, after performing a probability analysis, receiving a second known piece of data. In embodiments, operation 404 may be performed in a similar manner as operation 204 of FIG. 2, but at a later time—after a probability of the hypothesis being true has already been determined in operation 212 of FIG. 2. In this manner, the data collected in operation 204 may be used to initially determine a probability of the hypothesis being true, and the data collected here in operation 404 may be used to update a previously determined probability of the hypothesis being true after new data has been identified. After operation 404, the operating procedures of FIG. 4 move to operation 406.

Operation 406 depicts determining whether there is more of this additional data about the computer system. In embodiments, operation 406 may be implemented in a similar manner as operation 206 of FIG. 2. Where in operation 406 it is determined that there is not more of this additional data about the computer system, the operating procedures of FIG. 4 move to operation 408. Where in operation 406 is it determined that there is more of this additional data about the computer system, the operating procedures of FIG. 4 return to operation 404, where more data about the computer system is identified. This loop from operation 404 to operation 406, and then back to operation 404, may continue for as long as there is more of this additional data about the computer system to be identified.

Operation 408 depicts updating a probability of the hypothesis being true based on the data (for example, the data from operation 204 of FIG. 2), the additional data from operation 404, and the missing data (for example, the missing data as determined in operation 210 of FIG. 2). In embodiments, this may be described as performing a probability calculation on the at least one known piece of data, the at least one additional piece of data, and the second known piece of data to update the likelihood that the first potential source of the problem is actually the source of the problem. In embodiments, operation 408 may be performed in a similar manner as operation 212 of FIG. 2.

It may be that updating the probability that the hypothesis is true differs from originally determining the probability that the hypothesis is true because the operations of forward chaining and backward chaining are not repeated during the probability-updating process. This is because forward chaining is used to determine the hypothesis, and the hypothesis is already known (though it may be that additional information can be used to develop another hypothesis, as described with respect to FIG. 5).

Additionally, backward chaining takes the hypothesis and determines the missing information, which has already been performed, so backward chaining can be omitted here. The newly known information may be some of that previously identified missing information (e.g., it may be that where the hypothesis is an incorrect network configuration, the missing information is a particular routing table, and the newly known information is also that particular routing table, so that information is no longer missing), and where this is the case, the no-longer-missing information may be no longer considered to be missing when performing the probability analysis.

In other embodiments, this new information may comprise an update of previously known information. For example, the previously known information may be a routing table, and the new information may be an updated version of that routing table, as it has changed over time. After operation 408, the operating procedures of FIG. 4 move to operation 410, where the operating procedures of FIG. 4 end.

Figure 5:
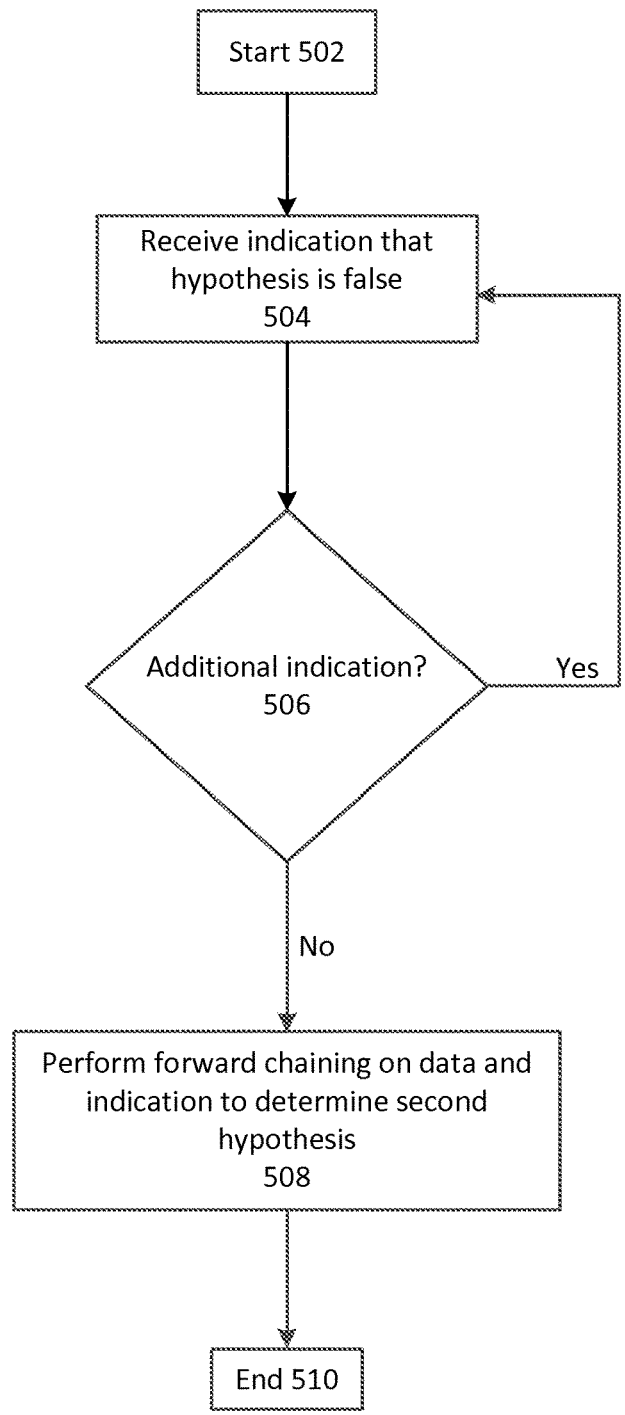
FIG. 5 depicts example operating procedures for determining a new hypothesis for why there is a problem with a computing system is correct, based on determining additional information about the computing system.

FIG. 5 depicts example operating procedures for determining a new hypothesis for why there is a problem with a computing system is correct based on determining additional information about the computing system. The operating procedures of FIG. 5 may be used to update a hypothesis (or hypotheses) determined via the operating procedures of FIG. 2 or 3. Similar to the operating procedures of FIGS. 2-4, in embodiments, the operating procedures of FIG. 5 may be implemented in trouble-shooting component 116 of FIG. 1. The operating procedures of FIG. 5 begin with operation 502, and then move to operation 504.

Operation 504 depicts receiving an indication that the hypothesis is false. In embodiments, this may comprise receiving an indication from a user that the first potential source of the problem is not actually the source of the problem. In embodiments, a user that requested information about the cause of the problem may have received an indication of the hypothesis, investigated the hypothesis manually, determined that the hypothesis was false, and provided input to trouble-shooting component 116 that indicates that this hypothesis is false. In other embodiments, data other than an indication that the hypothesis is false may be used to develop a new hypothesis. For example, developing a new hypothesis may be performed in response to receiving new data or updated data. After operation 504, the operating procedures of FIG. 5 move to operation 506.

Operation 506 depicts determining whether there is an additional indication that the hypothesis is false. In embodiments, operation 506 may be performed in a similar manner as operation 314, but where indications of a hypothesis being false are stored in object-level storage 118 and accessed by trouble-shooting component 116 instead of an indication of how many hypotheses there are (as it is in operation 314).

Where in operation 506 it is determined that there is not an additional indication that the hypothesis is false, the operating procedures of FIG. 5 move to operation 508. Where in operation 506 is it determined that there is n an additional indication that the hypothesis is false, the operating procedures of FIG. 5 return to operation 504, where an additional indication that the hypothesis is false is identified. This loop from operation 504 to operation 506 and then back to operation 504, may continue for as long as there is more of this additional data about the computer system to be identified.

Operation 508 depicts performing forward chaining on the data and the indication that the hypothesis is false to determine a second hypothesis. In embodiments, this may comprise performing forward chaining on the at least one piece of data and an indication from the user that the first potential source of the problem is not actually the source of the problem to determine a second potential source of a problem with the system or another system. In embodiments, operation 508 may be performed in a similar manner as operation 208 of FIG. 2, where both the previously known data and the indication that the previous hypothesis is false is used as input to the forward chaining process to determine a second hypothesis. After operation 508, the operating procedures of FIG. 5 move to operation 510, where the operating procedures of FIG. 5 end.

Figure 6:
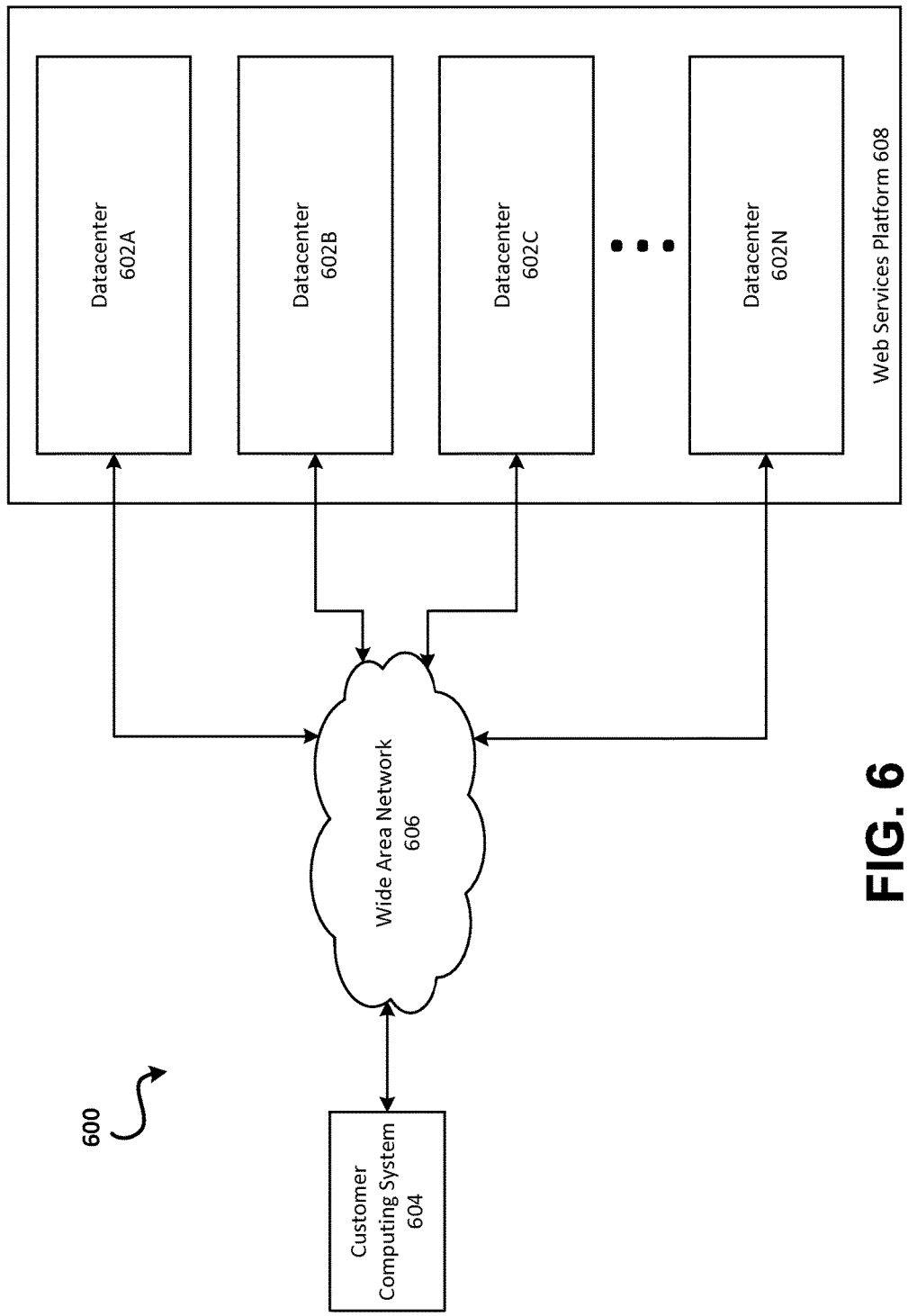
FIG. 6 depicts an example of a suitable computing environment in which embodiments described herein may be implemented.
Figure 7:
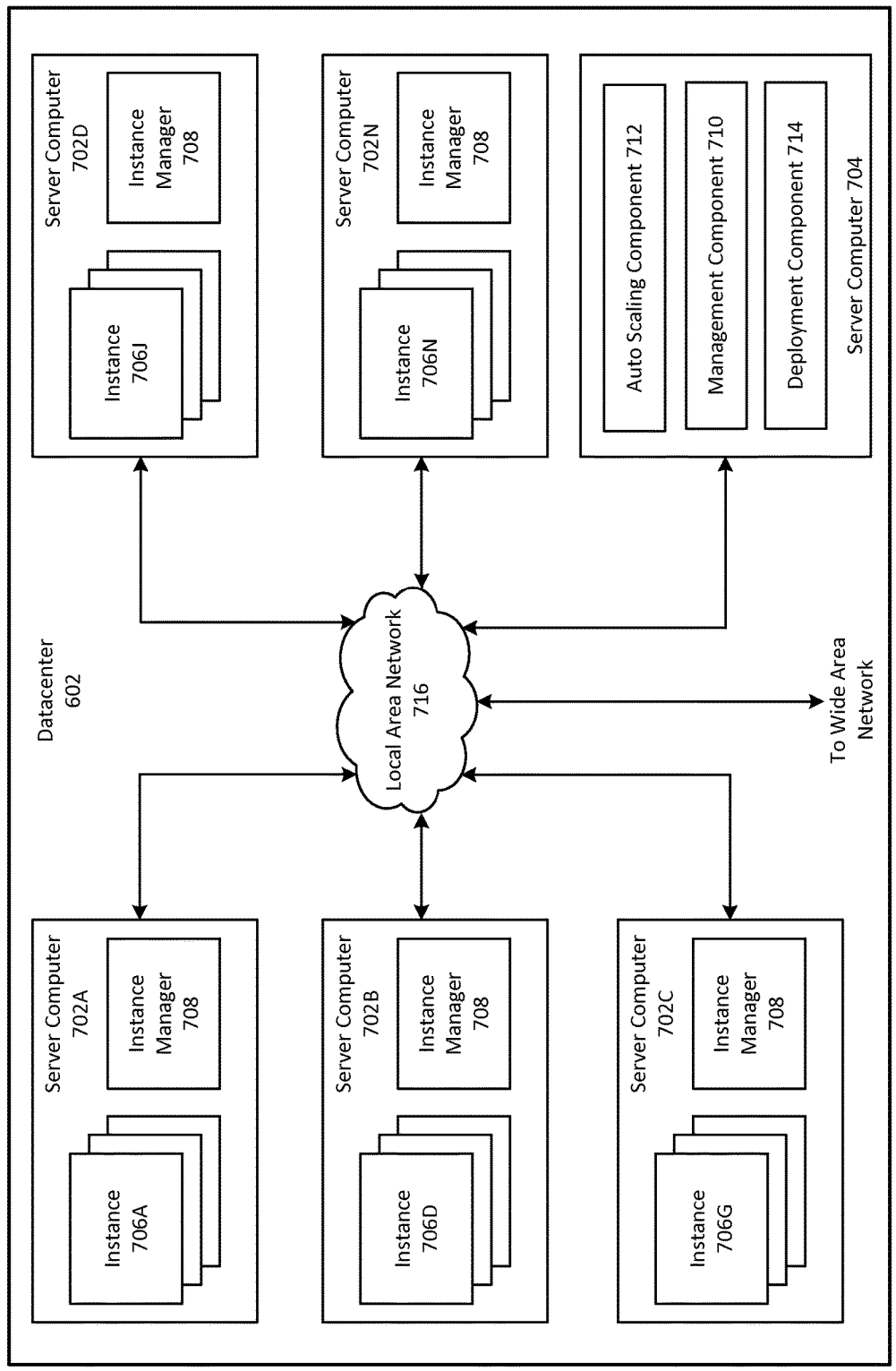
FIG. 7 depicts a computing system diagram that illustrates one configuration for datacenter that implements web services platform.
Figure 8:
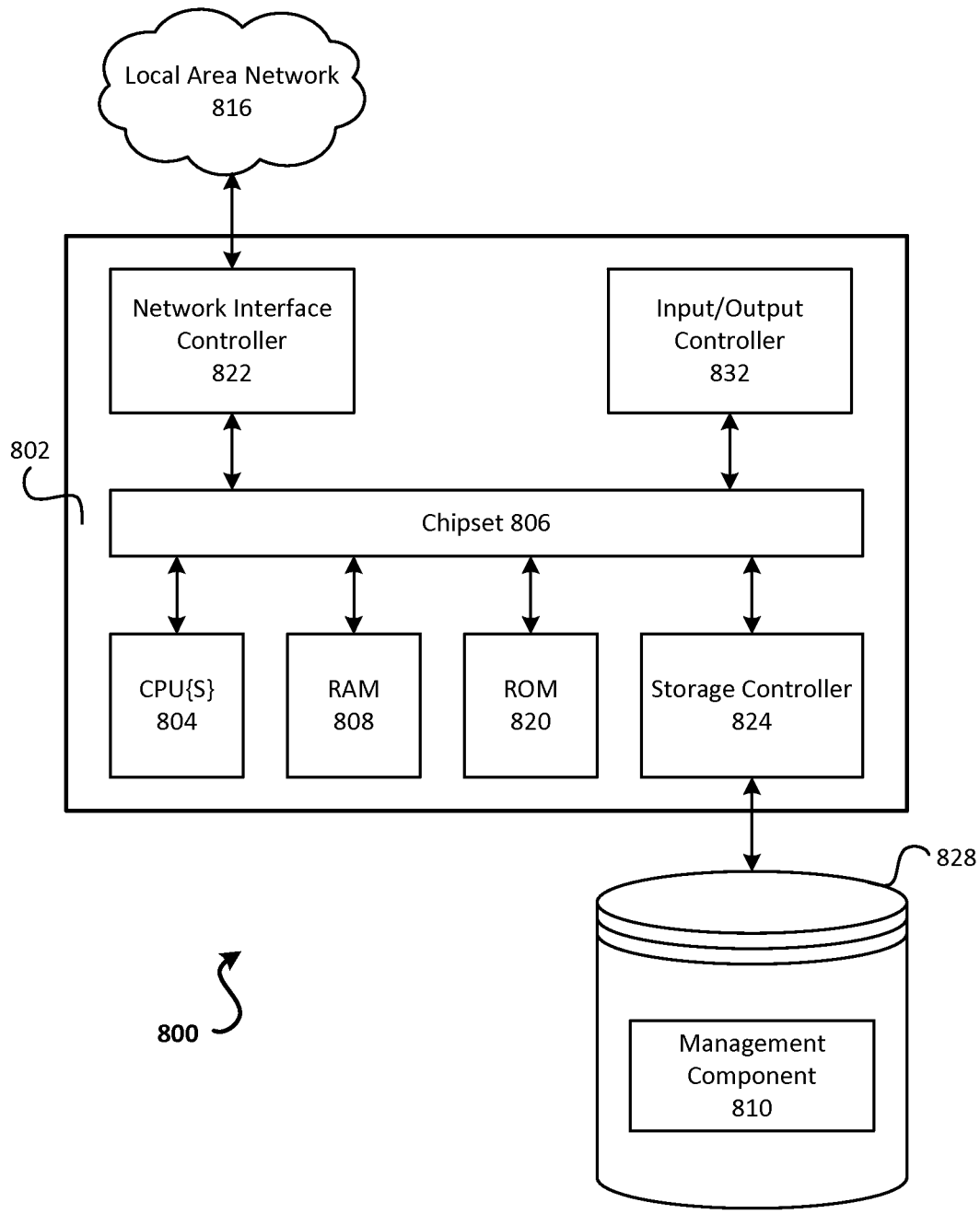
FIG. 8 depicts an example computer architecture for a computer capable of executing the above-described software components.

FIGS. 6-8 are similar to FIG. 1 in that they depict example operating environments in which embodiments disclosed herein may be implemented, and said figures depict these operating environments at varying levels of granularity. FIG. 6 generally depicts a web services platform that comprises a plurality of datacenters. FIG. 7 generally depicts a datacenter that comprises a plurality of computers. FIG. 8 generally depicts a computer that may be part of a datacenter.

It may be appreciated that these operating environments of FIGS. 6-8 may be used to implement aspects of the operating environment of FIG. 1. For example, edge device 106, host computer 110, and trouble-shooting component 116 may be implemented in a datacenter 602A of FIG. 6, or across multiple datacenters 602A, 602B, 602C, and/or 602N of FIG. 6. Likewise, Internet 104 of FIG. 1 may be wide area network 606 of FIG. 6, and customer computer A 102A and customer computer B 102B may each be customer computing system 604 of FIG. 6.

Turning now to details of FIG. 6, this figure depicts an example of a suitable computing environment in which embodiments described herein may be implemented. A cloud service provider (such as web services platform 608) may configure the illustrated computing environment to host virtual clouds of entities and to enable communication paths between these virtual clouds that may otherwise be isolated. In particular, FIG. 6 is a system and network diagram that shows an illustrative operating environment 600 that includes a web services platform 608 for implementing virtual clouds and for providing on-demand access to compute resources, such as virtual machine instances. Web services platform 608 can provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as Web servers and/or one large processing resource as a database server, for example.

The compute resources provided by web services platform 608 may be enabled by one or more datacenters 602A-602N, which may be referred herein singularly as "datacenter 602" or in the plural as "datacenters 602." Datacenters 602 may be facilities that house and operate computer systems and associated components and may include redundant and backup power, communications, cooling, and security systems. Datacenters 602 may be located in a same geographical area, such as in a same facility, and may be interconnected using private networks, such as high-speed fiber optic networks, controlled and managed by a service provider of web services platform 608. Datacenters 602 may also be distributed across geographically disparate locations and may be interconnected in part using public networks, such as the Internet. One illustrative configuration for datacenter 602 that implements the concepts and technologies disclosed herein is described below with regard to FIG. 7.

Entities of web services platform 608 may access the compute resources provided by datacenters 602 over a Wide Area Network ("WAN") 606. Although a WAN is illustrated in FIG. 6, it should be appreciated that a Local Area Network ("LAN"), the Internet, or any other networking topology known in the art that connects datacenters 602 to remote entities and other users may be utilized. It should also be appreciated that combinations of such networks may also be utilized.

An entity or other entities that are customers of web services platform 608 may utilize a computing system 604 to access the compute resources provided by datacenters 602. Customer computing system 604 comprises a computer capable of accessing web services platform 608, such as a server computer, a desktop or laptop personal computer, a tablet computer, a wireless telephone, a PDA, an e-reader, a game console, a set-top box, or any other computing node.

As is described in greater detail below, customer computing system 604 may be utilized to configure aspects of the compute resources provided by web services platform 608. In this regard, web services platform 608 may provide a web interface through which aspects of its operation may be configured through the use of a web browser application program executing on customer computing system 604. Alternatively, a stand alone application program executing on customer computing system 604 may access an application programming interface ("API") exposed by web services platform 608 for performing the configuration operations. Other mechanisms for configuring the operation of web services platform 608, including launching new virtual machine instances on web services platform 608, may also be utilized.

According to embodiments disclosed herein, capacities of purchased compute resources provided by web services platform 608 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 608 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 7 depicts a computing system diagram that illustrates one configuration for datacenter 602 that implements web services platform 608. With regards to elements of the web services platform previously described with respect to FIG. 1, host computer 110 may be a server computer 702 of FIG. 7 (which itself may be computer 800 of FIG. 8), host partition 112 may be an instance of instance manager 708 (where a host partition serves a hypervisor-type role), and VM instances 114A and 114B may each be an instance 706 of FIG. 7. Network infrastructure 108 of FIG. 1 may be local area network 716 of FIG. 7, and trouble-shooting component 116 of FIG. 1 may be server computer 704 of FIG. 7.

The example datacenter 602 shown in FIG. 7 may include several server computers 702A-702N, which may be referred herein singularly as "server computer 702" or in the plural as "server computers 702," for providing compute resources for hosting virtual clouds and for executing applications. Server computers 702 may be standard tower or rack-mount server computers configured appropriately for providing the compute resources described above. For instance, in one implementation server computers 702 may be configured to provide instances 706A-706N of compute resources.

Instances 706A-706N, which may be referred herein singularly as "instance 706" or in the plural as "instances 706," may be virtual machine instances. As known in the art, a virtual machine instance is an instance of a software implementation of a machine (i.e., a computer) that executes programs like a physical machine. In the example of virtual machine instances, each server 702 may be configured to execute an instance manager 708 capable of executing the instances. Instance manager 708 may be a hypervisor or another type of program configured to enable the execution of multiple instances 706 on a single server 702, for example. As discussed above, each of instances 706 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 602 shown in FIG. 7 may also include a server computer 704 reserved for executing software components for managing the operation of datacenter 602, server computers 702 and instances 706. In particular, server computer 704 may execute a management component 710. As discussed above, working between FIG. 6. and FIG. 7, an entity of web services platform 608 may utilize customer computing system 604 to access management component 710 to configure various aspects of the operation of web services platform 608 and instances 706 purchased by the entity. For example, the entity may purchase instances and make changes to the configuration of the instances. The entity may also specify settings regarding how the purchased instances are to be scaled in response to demand. The entity may also provide requests to launch instances to management component 710.

As also described briefly above, an auto scaling component 712 may scale instances 706 based upon rules defined by an entity of web services platform 608. For example, auto scaling component 712 may allow an entity to specify scale up rules for use in determining when new instances should be instantiated and scale down rules for use in determining when existing instances should be terminated.

As discussed briefly above, datacenter 602 may also be configured with a deployment component 714 to assist entities in the deployment of new instances 706 of compute resources. Deployment component 714 may receive a configuration from an entity that includes data describing how new instances 706 should be configured. For example, the configuration may specify one or more applications that should be installed in new instances 706, provide scripts and/or other types of code to be executed for configuring new instances 706, provide cache warming logic specifying how an application cache should be prepared and other types of information.

Deployment component 714 may utilize the entity-provided configuration and cache warming logic to configure, prime, and launch new instances 706. The configuration, cache warming logic and other information may be specified by an entity using management component 710 or by providing this information directly to deployment component 714. Other mechanisms may also be utilized to configure the operation of deployment component 714.

In the example datacenter 602 shown in FIG. 7, an appropriate LAN 716 may be utilized to interconnect server computers 702A-702N and server computer 704. LAN 716 may also be connected to WAN 606 illustrated in FIG. 6. It should be appreciated that the network topology illustrated in FIGS. 6 and 7 has been greatly simplified and that many more networks and networking devices may be utilized to interconnect the various computing systems disclosed herein. Appropriate load balancing devices or software modules may also be utilized for balancing a load between each of datacenters 602A-602N, between each of server computers 702A-702N in each datacenter 602 and between instances 706 purchased by each entity of web services platform 608. These network topologies and devices should be apparent to those skilled in the art.

It should be appreciated that datacenter 602 described in FIG. 7 is merely illustrative and that other implementations may be utilized. In particular, functionality described herein as being performed by management component 710, auto scaling component 712 and deployment component 714 may be performed by one another, may be performed by other components or may be performed by a combination of these or other components. Additionally, it should be appreciated that this functionality may be implemented in software, hardware, or a combination of software and hardware. Other implementations should be apparent to those skilled in the art.

FIG. 8 depicts an example computer architecture 800 for a computer 802 capable of executing the above-described software components. With regard to the example operating environment with respect to FIG. 1, host computer 110 and trouble-shooting component 116, as well as customer computer A 102A, and customer computer B 102B may each be implemented in computer 802 of FIG. 8.

The computer architecture 800 shown in FIG. 8 illustrates a conventional server computer, workstation, desktop computer, laptop, tablet, network appliance, PDA, e-reader, digital cellular phone, or other computing node, and may be utilized to execute any aspects of the software components presented herein described as executing within datacenters 602A-602N, on server computers 702A-702N, on the customer computing system 604, or on any other computing system mentioned herein.

Computer 802 may include a baseboard, or "motherboard," which is a printed circuit board to which a multitude of components or devices may be connected by way of a system bus or other electrical communication paths. One or more central processing units ("CPUs") 804 may operate in conjunction with a chipset 806. CPUs 804 may be standard programmable processors that perform arithmetic and logical operations necessary for the operation of computer 802.

CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 806 may provide an interface between CPUs 804 and the remainder of the components and devices on the baseboard. Chipset 806 may provide an interface to a random access memory ("RAM") 808 used as the main memory in computer 802. Chipset 806 may further provide an interface to a computer-readable storage medium, such as a read-only memory ("ROM") 820 or non-volatile RAM ("NVRAM") (not shown), for storing basic routines that may help to start up computer 802 and to transfer information between the various components and devices. ROM 820 or NVRAM may also store other software components necessary for the operation of computer 802 in accordance with the embodiments described herein.

Computer 802 may operate in a networked environment using logical connections to remote computing nodes and computer systems through LAN 816. Chipset 806 may include functionality for providing network connectivity through a network interface controller ("NIC") 822, such as a gigabit Ethernet adapter. NIC 822 may be capable of connecting the computer 802 to other computing nodes over LAN 816. It should be appreciated that multiple NICs 822 may be present in computer 802, connecting the computer to other types of networks and remote computer systems.

Computer 802 may be connected to a mass storage device 828 that provides non-volatile storage for the computer. Mass storage device 828 may store system programs, application programs, other program modules and data, which have been described in greater detail herein. Mass storage device 828 may be connected to computer 802 through a storage controller 824 connected to chipset 806. Mass storage device 828 may consist of one or more physical storage units. Storage controller 824 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 802 may store data on mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 828 is characterized as primary or secondary storage and the like.

For example, computer 802 may store information to mass storage device 828 by issuing instructions through storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 802 may further read information from mass storage device 828 by detecting the physical states or characteristics of one or more particular locations within the physical storage units.

In addition to mass storage device 828 described above, computer 802 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 802.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

Mass storage device 828 may store an operating system utilized to control the operation of the computer 802. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 828 may store other system or application programs and data utilized by computer 802, such as management component 810 and/or the other software components described above.

Mass storage device 828 or other computer-readable storage media may also be encoded with computer-executable instructions, which, when loaded into computer 802, transforms the computer from a general-purpose computing system into a special-purpose computer capable of implementing the embodiments described herein. These computer-executable instructions transform computer 802 by specifying how CPUs 804 transition between states, as described above. Computer 802 may have access to computer-readable storage media storing computer-executable instructions, which, when executed by computer 802, may perform operating procedures depicted in FIGS. 2-5.

Computer 802 may also include an input/output controller 832 for receiving and processing input from a number of input devices, such as a keyboard, a mouse, a touchpad, a touch screen, an electronic stylus, or other type of input device. Similarly, input/output controller 832 may provide output to a display, such as a computer monitor, a flat-panel display, a digital projector, a printer, a plotter, or other type of output device. It will be appreciated that computer 802 may not include all of the components shown in FIG. 8, may include other components that are not explicitly shown in FIG. 8 or may utilize an architecture completely different than that shown in FIG. 8.

As described herein, a computing node may be a physical computing node, such as computer 802 of FIG. 8. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for identifying a potential source of a problem in an operating environment of a computer system, comprising:
    identifying at least one known piece of data about the operating environment of the computer system;
    performing forward chaining on the at least one piece of data to determine a first potential source of the problem;
    performing backward chaining on the first potential source of the problem to determine at least one additional piece of data that, if known to be true for the operating environment of the computer system, would increase a likelihood that the first potential source of the problem has been correctly identified for the operating environment of the computer system;
    performing a Bayesian probability analysis on the at least one known piece of data and the at least one additional piece of data to determine a likelihood that the first potential source of the problem correctly identifies the source of the problem; and
    identifying at least the first potential source of the problem and the likelihood that the first potential source of the problem correctly identifies the source of the problem to a user of the computer system; and
    identifying remedial action based on the first potential source of the problem.

2. The computer-implemented method of claim 1, further comprising:
    performing forward chaining on the at least one piece of data to determine a second potential source of the problem;
    performing the Bayesian probability analysis on the at least one known piece of data and the at least one additional piece of data to determine a likelihood that the second potential source of the problem correctly identifies the source of the problem; and
    identifying the second potential source of the problem and the likelihood that the second potential source of the problem correctly identifies the source of the problem to the user of the computer system.

3. A system, comprising:
    a processor; and
    a memory communicatively coupled to the processor when the system is operational, the memory bearing instructions that, upon execution by the processor, cause the system at least to:
        perform forward chaining on at least one known piece of data to determine a first potential source of a problem with an operating environment of the system or another system;
        perform backward chaining on the first potential source of the problem to determine at least one additional piece of data that, if present, would increase or decrease a likelihood that the first potential source of the problem has been correctly identified; and
        perform a probability analysis on the at least one known piece of data and the at least one additional piece of data to determine a likelihood that the first potential source of the problem is actually the source of the problem; and identifying the first potential source of the problem and a likelihood that the first potential source of the problem is actually the source of the problem.

4. The system of claim 3, wherein the memory further bears instructions that, when executed on the processor, cause the system at least to:

identify the first potential source of the problem and the likelihood that the first potential source of the problem is actually the source of the problem to a user of the system.

5. The system of claim 4, wherein the memory further bears instructions that, when executed on the processor, cause the system at least to:

identify a remedy to the first potential source of the problem to the user of the system.

6. The system of claim 3, wherein the instructions that, when executed on the processor, cause the system at least to perform the probability analysis further cause the system at least to:

perform a Bayesian probability analysis on the at least one known piece of data and the at least one additional piece of data to determine the likelihood that the first potential source of the problem is actually the source of the problem.

7. The system of claim 3, wherein the memory further bears instructions that, when executed on the processor, cause the system at least to:

perform forward chaining on the at least one piece of data to determine a second potential source of the problem; and perform the probability analysis on the at least one known piece of data and the at least one additional piece of data to determine a likelihood that the second potential source of the problem is actually the source of the problem.

8. The system of claim 3, wherein the memory further bears instructions that, when executed on the processor, cause the system at least to:

receive an indication from a user that the first potential source of the problem is not actually the source of the problem; and perform forward chaining on the at least one piece of data and the indication from the user that the first potential source of the problem is not actually the source of the problem to determine a second potential source of the problem with the system or another system.

9. The system of claim 3, wherein the at least one known piece of data is generated within the system, and wherein the at least one additional piece of data is generated outside of the system.

10. The system of claim 3, wherein the probability analysis is performed based at least in part on machine learning.

11. The system of claim 3, wherein the probability analysis is performed based at least in part on history data of prior performed probability analysis.

12. The system of claim 3, wherein the probability analysis is performed based at least in part on a user indication of a rule to be used in the probability analysis.

13. The system of claim 3, wherein the memory further bears instructions that, when executed on the processor, cause the system at least to:

after performing the probability analysis, receive a second known piece of data; and perform the probability analysis on the at least one known piece of data, the at least one additional piece of data, and the second known piece of data to update the likelihood that the first potential source of the problem is actually the source of the problem.

14. A non-transitory computer-readable storage medium, bearing computer-readable instructions that, when executed on a computer, cause the computer to perform operations comprising:

performing forward chaining on at least one known piece of data to determine a first potential source of a problem with an operating environment of a computer system;

performing backward chaining on the first potential source of the problem to determine at least one additional piece of data that, if present, would increase or decrease a likelihood that the first potential source of the problem has been correctly identified; and performing a probability analysis on the at least one known piece of data and the at least one additional piece of data to determine a likelihood that the first potential source of the problem is actually the source of the problem; and identifying the first potential source of the problem and a probability the first potential source of the problem is actually the source of the problem.

15. The non-transitory computer-readable storage medium of claim 14, further bearing computer-readable instructions that, when executed on the computer, cause the computer to perform operations comprising:

performing forward chaining on the at least one piece of data to determine a second potential source of the problem; and performing the probability analysis on the at least one known piece of data and the at least one additional piece of data to determine a likelihood that the second potential source of the problem is actually the source of the problem.

16. The non-transitory computer-readable storage medium of claim 14, further bearing computer-readable instructions that, when executed on the computer, cause the computer to perform operations comprising:

receiving an indication from a user that the first potential source of the problem is not actually the source of the problem; and performing forward chaining on the at least one piece of data and the indication from the user that the first potential source of the problem is not actually the source of the problem to determine a second potential source of the problem with the computer system.

17. The non-transitory computer-readable storage medium of claim 14, wherein the forward chaining or the backward chaining is performed based at least in part on machine learning.

18. The non-transitory computer-readable storage medium of claim 14, wherein the forward chaining or the backward chaining is performed based at least in part on history data of prior performed forward chaining or backward chaining.

19. The non-transitory computer-readable storage medium of claim 14, wherein the forward chaining or the backward chaining is performed based at least in part on a user indication of a rule to be used in the probability analysis.

20. The non-transitory computer-readable storage medium of claim 14, further bearing computer-readable instructions that, when executed on a computer, cause the computer to perform operations comprising:

after performing the probability analysis, receiving a
  second known piece of data; and
performing the probability analysis on the at least one
  known piece of data, the at least one additional piece of
  data, and the second known piece of data to update the
  likelihood that the first potential source of the problem
  is actually the source of the problem.

* * * * *